(12) United States Patent
Beard, III et al.

(10) Patent No.: US 12,109,692 B2
(45) Date of Patent: Oct. 8, 2024

(54) METHOD FOR TEACHING TORCH ORIENTATION FOR ROBOTIC WELDING

(71) Applicants: James Walter Beard, III, Cookeville, TN (US); Stephen Lee Canfield, Cookeville, TN (US); Stephen Zuccaro, Cookeville, TN (US)

(72) Inventors: James Walter Beard, III, Cookeville, TN (US); Stephen Lee Canfield, Cookeville, TN (US); Stephen Zuccaro, Cookeville, TN (US)

( * ) Notice: Subject to any disclaimer, the term of this patent is extended or adjusted under 35 U.S.C. 154(b) by 84 days.

(21) Appl. No.: 17/588,001

(22) Filed: Jan. 28, 2022

(65) Prior Publication Data

US 2023/0226682 A1 Jul. 20, 2023

Related U.S. Application Data

(60) Provisional application No. 63/300,284, filed on Jan. 18, 2022.

(51) Int. Cl.
| | |
|---|---|
| *B25J 13/00* | (2006.01) |
| *B25J 9/00* | (2006.01) |
| *B25J 11/00* | (2006.01) |
| *B23K 37/02* | (2006.01) |

(52) U.S. Cl.
CPC .......... *B25J 9/0081* (2013.01); *B25J 11/005* (2013.01); *B23K 37/0229* (2013.01); *B25J 13/00* (2013.01)

(58) Field of Classification Search
CPC .......... B25J 11/005; B25J 13/00; B25J 13/02; B25J 9/1664; B25J 13/088; B25J 9/1697; B25J 9/1684; B25J 19/022; G01S 17/86; G01S 17/88; G01S 7/497; G01S 17/89; G01S 17/08; G01S 17/87; B23K 37/0229; B23K 9/0956; B23K 31/125; G01C 3/02; G06T 7/80; G05B 2219/45065
See application file for complete search history.

(56) References Cited

U.S. PATENT DOCUMENTS

| | | | | |
|---|---|---|---|---|
| 4,835,710 | A * | 5/1989 | Schnelle | G05B 19/41 |
| | | | | 901/14 |
| 9,199,374 | B2 * | 12/2015 | One | G05B 19/423 |
| 9,242,373 | B2 * | 1/2016 | One | B23K 9/12 |
| 10,747,393 | B2 * | 8/2020 | Albright | G06F 3/04847 |

(Continued)

OTHER PUBLICATIONS

Shoham et al., An Optical Sensor for Real-Time Positioning, Tracking, and Teaching of Industrial Robots, 1984, IEEE, p. 159-163 (Year: 1984).*

(Continued)

*Primary Examiner* — McDieunel Marc

(57) ABSTRACT

Robots are commonly used for automated MIG (Metal Inert Gas) or TIG (Tungsten Inert Gas) welding in many industries such as automotive manufacturing. A weld procedure is defined and the robot performs motion control of the weld torch along the weld seam, while starting and stopping the arc as desired along the weld seams. The robot controls the motion of the torch along the weld path. The motion is defined by a combination of the position and orientation of the torch which is attached to the robot end-effector. The weld specification will generally prescribe a portion or all of the desired orientation of the torch. This information can be used to reduce the complexity of programming a weld path for a robot.

11 Claims, 10 Drawing Sheets shows work angle, travel angle and torch roll angle for a general butt weld seam.

shows work angle, travel angle and torch roll angle for a general straight weld seam.

(56) References Cited

U.S. PATENT DOCUMENTS

| | | | |
|---|---|---|---|
| 10,828,715 B2* | 11/2020 | Rajagopalan | B23K 9/0953 |
| 11,396,057 B2* | 7/2022 | Boillot | G01S 17/86 |
| 2009/0179021 A1* | 7/2009 | Nishimura | B23K 9/1272 |
| | | | 219/136 |
| 2011/0075814 A1* | 3/2011 | Boese | A61B 6/4441 |
| | | | 378/197 |
| 2013/0345868 A1* | 12/2013 | One | B25J 9/1664 |
| | | | 700/252 |
| 2021/0016437 A1* | 1/2021 | Pivac | E04G 21/22 |
| 2021/0260750 A1* | 8/2021 | Beard, III | B25J 9/0081 |

OTHER PUBLICATIONS

Maeyer et al., Cartesian path planning for arc welding robots: Evaluation of the descartes algorithm, 2018, IEEE, p. 1-8 (Year: 2018).*

Richter et al., A spatial path specification system for mechanism development, 2009, IEEE, p. 236-241 (Year: 2009).*

Haihua et al., Cooperative motion planning of dual industrial robots via offline programming, 2018, IEEE, p. 46-51 (Year: 2018).*

Freitas et al., High precision trajectory planning on freeform surfaces for robotic manipulators, 2017, IEEE, p. 3695-3700 (Year: 2017).*

* cited by examiner

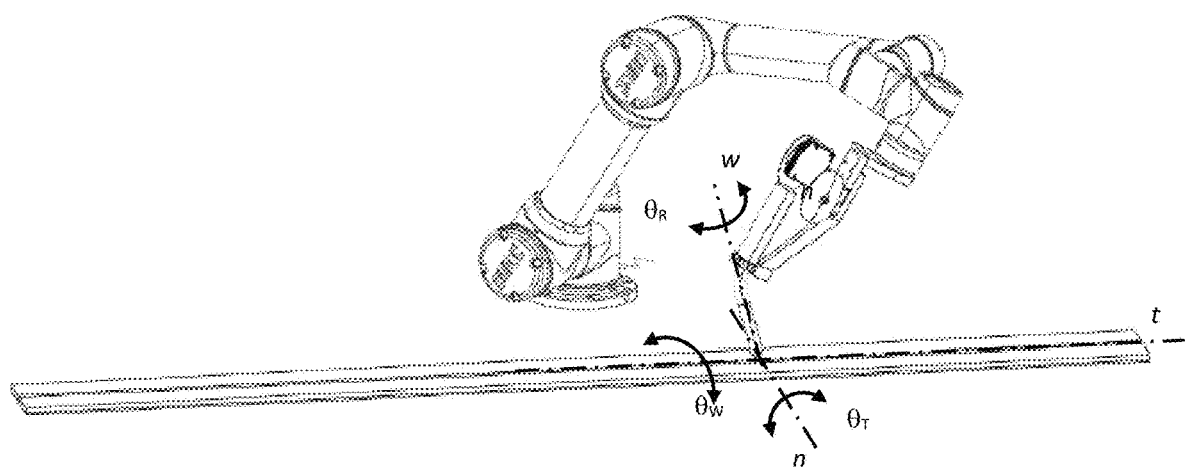
Figure 1a shows work angle, travel angle and torch roll angle for a general butt weld seam.

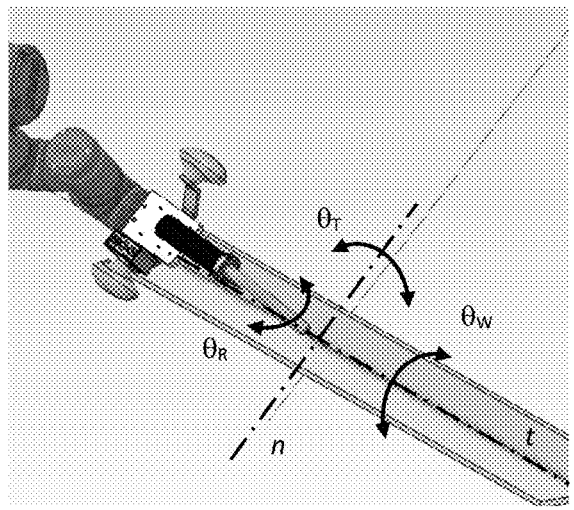
Figure 1b shows work angle, travel angle and torch roll angle for a general straight weld seam.

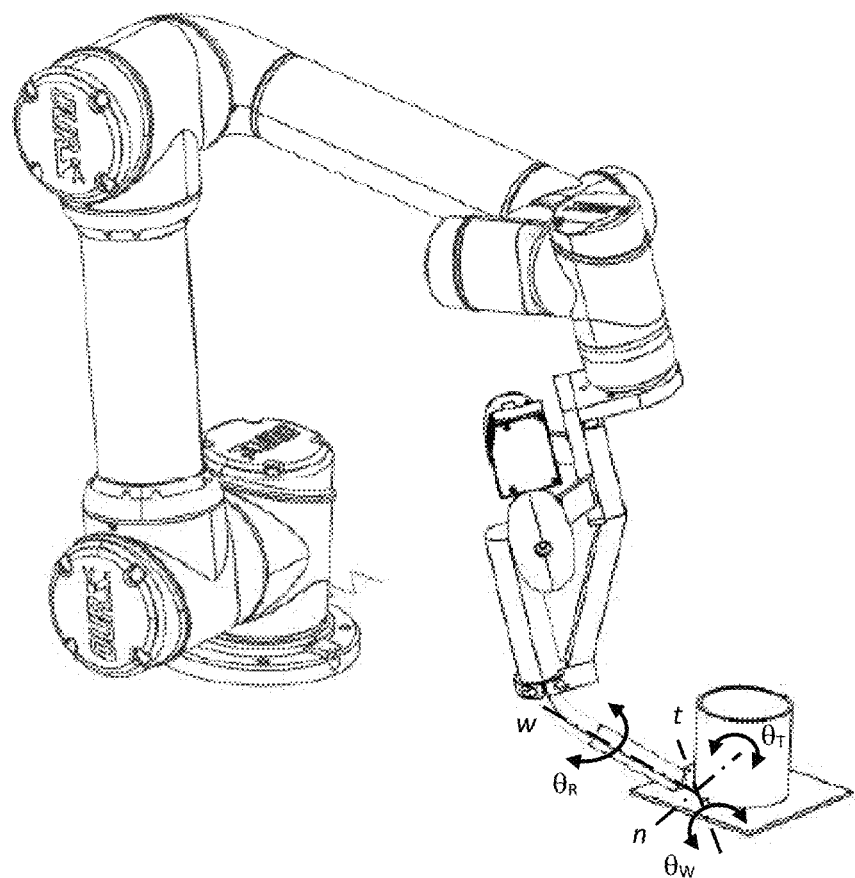
Figure 2 shows work angle, travel angle and torch roll angle for a general circular weld seam.

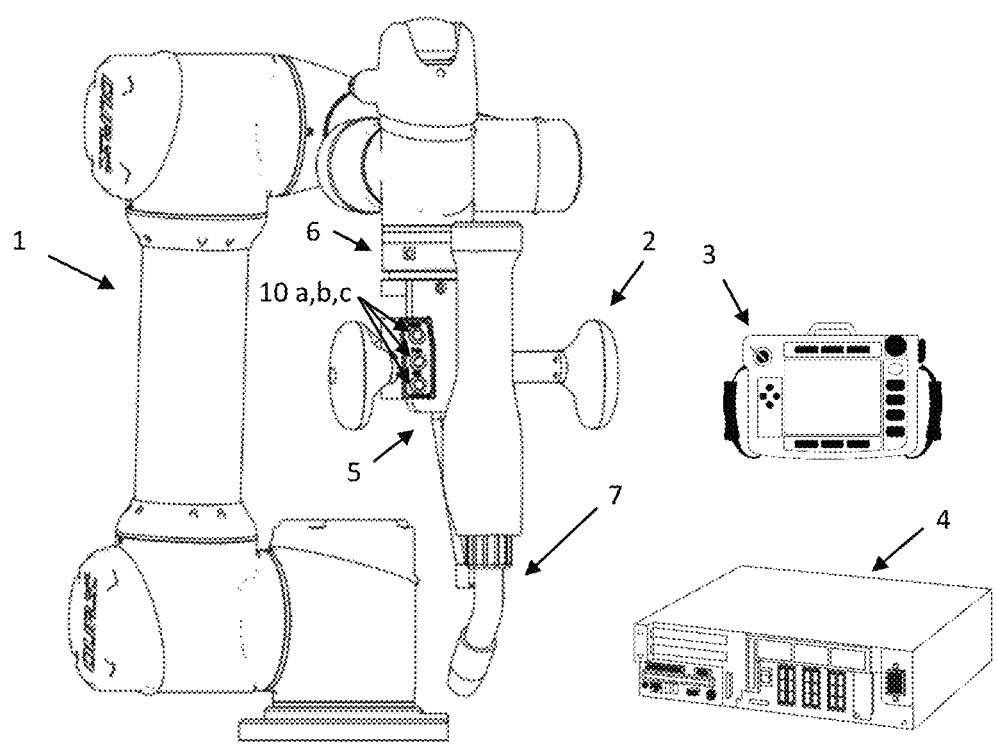
Figure 3 shows the robot with lead-through handle, torch and input units.

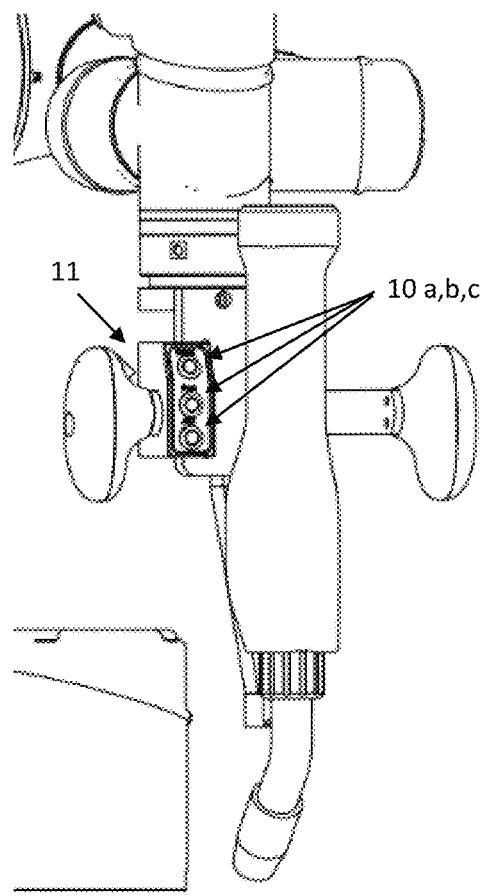
Figure 4 shows a close-up view of the lead-through handle with input units.

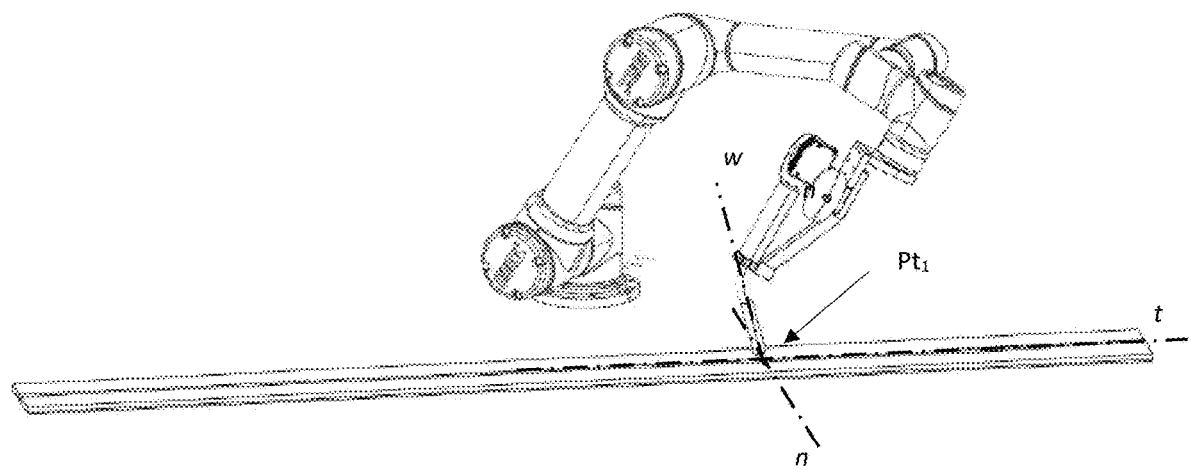
Fig 5a Robot end-effector at one position and desired orientation along the weld path.

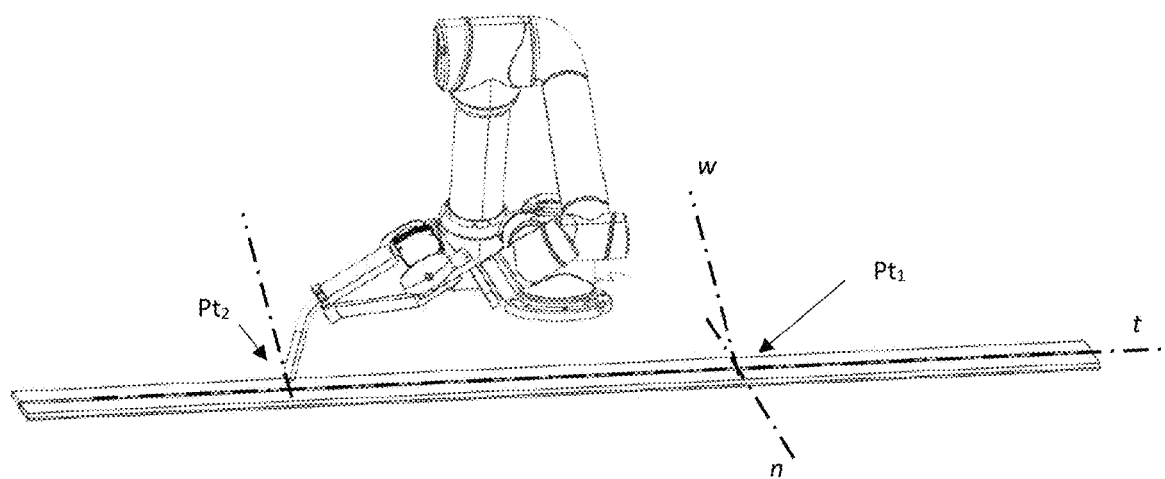
Fig. 5b Robot end-effector at a second position and new orientation along the weld path

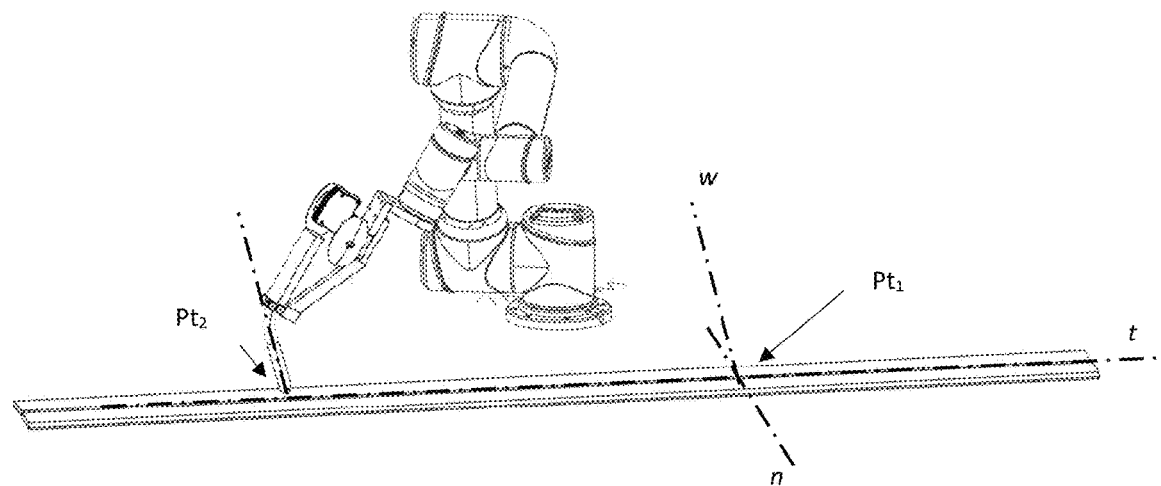
Fig. 5c Robot end-effector at a second position and desired orientation along the weld path

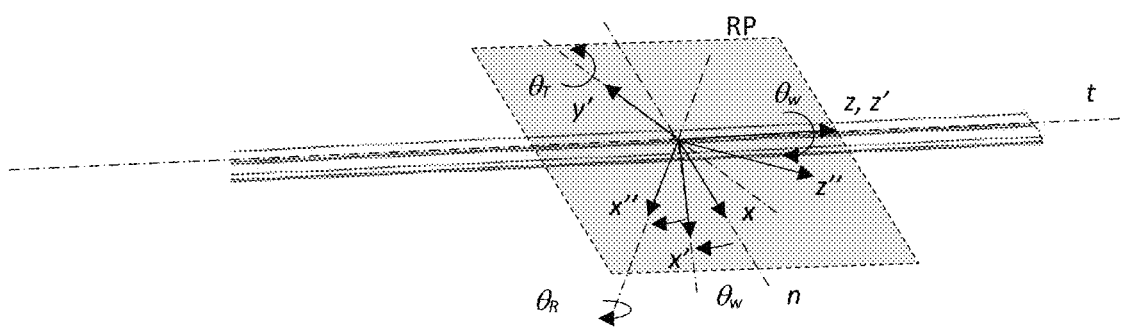
Fig. 6 Rotation projecting the torch frame onto global frame

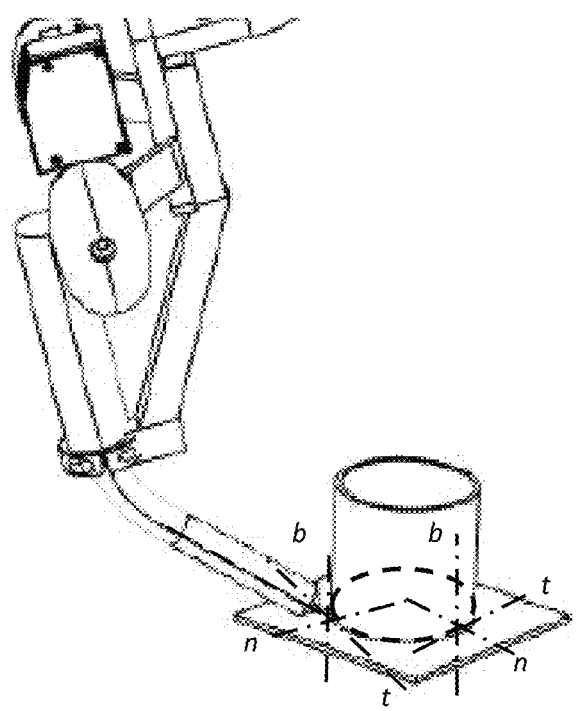
Fig. 7 Circular weld with Frenet-Serret frames at two points along weld

METHOD FOR TEACHING TORCH ORIENTATION FOR ROBOTIC WELDING

STATEMENT REGARDING FEDERALLY SPONSORED RESEARCH OR DEVELOPMENT

Not Applicable

DESCRIPTION OF ATTACHED APPENDIX

Not Applicable

BACKGROUND OF THE INVENTION

Robots are commonly used for automated MIG (Metal Inert Gas) or TIG (Tungsten Inert Gas) welding in many industries such as automotive manufacturing. A weld procedure is defined and the robot performs motion control of the weld torch along the weld seam, while starting and stopping the arc as desired along the weld seams. In many cases, weld parameters are coordinated between the robot and the welding power supply to provide advanced weld characteristics and capabilities. In typical robotic welding applications, a fixture or jig is created to provide repeatable positioning and orienting the part, as well as to hold the part secure as the weld is performed. The weld path or operating path is defined as a collection of a finite number of successive positions and orientations (or poses) of the welding torch relative to the weld seam. The operating path will provide the desired motion to perform the weld. The time or complexity of programming presents an obstacle in using robotic automation in welding or other tasks for small to medium enterprises that lack resources for training or expertise in traditional robot programming strategies. This invention seeks to reduce the complexity of programming associated with robots for tasks such as welding and to stabilize the accuracy of welding.

DESCRIPTION OF THE PRIOR ART

Programming the operating weld path adds time to the overall manufacturing process. When the operating path is used in manufacturing large numbers of similar parts, i.e., parts that can be welded using a common operating path, the time required to program the operating path represents a small portion of the overall manufacturing cost. When manufacturing a small number of repetitive parts, the time to program the operating path can be significant. It is therefore desirable to reduce the time required to programming time. Methods used to reduce the programming time include programming successive robot positions by the lead through teaching on an actual part (U.S. Pat. No. 4,408,286), offline programming on a computer simulation of the manufacturing setup or automated robot motion programming (U.S. 60/656,435). The teach pendant programming method is generally disclosed in U.S. Pat. No. 4,589,810. This is referred to as on-line programming method in which the programmer makes use of an interface that may include switches or a joystick to move the end effector though an operating path with respect to the actual part being manufactured. The program is constructed by recording successive positions into memory in a computer that is associated with the robot system. The recorded information consists of information that generally includes the robot position and orientation, robot speed, linear or curvilinear motion type and arc information. This information serves as a series of instruction recorded in a sequential fashion and forms a program or code that is stored into memory in a computer that is associated with the robot system. The welding robot performs a pre-programmed welding task by operating according to the instructions that are stored in the program.

This patent makes use of the Lead through teaching method as is generally disclosed in U.S. Pat. No. 4,408,286. The lead through teaching method involves teaching successive positions of the operating path by grasping or guiding the tool head directly to follow a path. The robot is moved to a specific position and orientation at specific points along the path, these specific positions and orientations are recorded in a program that resides in memory in a computer associated with the robot system. The program defines the operating path that passes through the specific points, and travels along an interpolated path or planned path between the specific points. The interpolated path could be linear, quadratic or some other interpolating function commonly known as a path planning function as defined by the programmer. The programmer is responsible to ensure that the robot is accurately guided to the specific points and avoids collision with objects in the workspace. The programmer also defines any additional functions that the robot will perform.

These include turning the arc on or off, other arc information, the type of move (linear or curvilinear), and the speed of the tool.

The position and orientation of the torch is critical to the maintaining the quality of the weld. The torch position defines the location of the arc as the wire tip during welding. The torch orientation defines the work angle and travel angle of the torch relative to the weld seam. Work angle defines the rotation of the torch about an axis lying parallel to the instantaneous tangential of the weld seam. Travel angle defines the rotation of the torch about an axis perpendicular to axes lying parallel to the weld seam and parallel to the wire as it is extruded from the torch tip. These angles are shown in FIG. 1. Since welding is considered to be an axes-symmetric task, the third angle (called torch roll here) defined as a rotation about an axis parallel to the wire as it is extruded from the torch tip does not affect the weld process. However, the torch roll may be important for clearance with parts in the robot workspace or to keep the robot in a preferred configuration for most efficient motion. The operator is responsible to define the desired work angle, travel angle and torch roll angle at every position along the weld task in addition to the torch tip position. The work angle and travel angle are defined by the weld procedure and need to be consistent over multiple positions along the weld path relative to the part. This invention reduces the effort of teaching a robotic weld program by reducing the effort to define torch orientation relative to traditional approaches.

This invention is related to several other patents. In U.S. Pat. No. 6,452,134B2, inventors describe a method for correcting the teaching point for a welding robot having a touch sensor using the touch sensor to detect a point on the workpieces and developing a transformation matrix based on the difference between the preset teaching points and the newly detected point. This transformation matrix then represents a correction that can be applied to one or multiple preset teaching points. A similar correction approach is shown in JP2010190301A.

U.S. Pat. No. 5,845,053A shows a method for teaching welding torch orientation based on taught points (translational portion of robot pose) along the weld scam and additional points defining weld plane Patent JPH08123536A seeks to reduce the effort in teaching a welding torch attitude by automatically calculating weld torch attitude or orientation based on taught points (translational portion of robot pose) along the weld seam, a reference plane that is designated and the work and travel angle.

Patent JP36653442B2 shows a Jog operation method for an industrial robot which is used to conveniently jog the robot position or orientation around coordinate axes that relate to the robot path, such as the weld path or tool axes with jog motions along these axes facilitated through the robot kinematics.

U.S. patent Ser. No. 10/056,010B2 describes a system and method for a weld training system in which the weld training system comprises a torch with sensors to gather the current or dynamic position and orientation of the sensors attached to the torch. This information is displayed in a simulated welding environment.

U.S. Pat. No. 1,071,240B2 describes a programming method for welding robot in which a three-dimensional model of the robot and weld workpiece are obtained, and the appropriate position and orientation of the tool coordinate system (torch and robot end-effector) is calculated from this and desired work and travel angles.

SUMMARY OF THE INVENTION

This patent defines a method for reducing the effort of programming of robot motion for a weld task by storing the robot pose (position and orientation) along the weld path as a combination of current torch tip position and orientation stored in memory in the robot controller. The torch orientation is part of the weld specification to meet a particular work angle (rotation of the torch about the weld axis) and travel angle (rotation of the torch about an axis perpendicular to the weld axis and torch axis). These weld specifications on torch orientation may be constant for large portions of the weld task and for linear segments of the weld, are constant relative to a fixed frame. For curvilinear segments, are constant for a Frenet frame that is uniquely defined from the curvilinear weld path. The operator can move the torch to this orientation one time and store it in memory in the robot controller. The operator can then reuse the stored orientation multiple times when teaching points along the weld task by storing the robot pose as a combination of current torch tip position and orientation stored in memory in the robot controller.

Furthermore, a stored orientation can be recalled at any time on the robot end-effector. When the orientation is recalled, the torch tip position is held fixed and the torch orientation is moved to the one recalled. Multiple orientations can be stored and recalled. This greatly reduces the effort required by the robot operator to teach a weld path.

BRIEF DESCRIPTION OF THE FIGURES

FIG. 1a,b shows work angle, travel angle and torch roll angle for a general straight weld seam.

FIG. 2 shows work angle, travel angle and torch roll angle for a general circular weld seam.

FIG. 3 shows the robot with lead-through handle, torch and input units.

FIG. 4 shows a close-up view of the lead-through handle with input units.

FIG. 5a,b,c shows the robot torch in a configuration before orientation recall and after orientation recall.

FIG. 6 shows a set of frames projecting a torch frame onto a fixed frame.

FIG. 7 shows a Circular weld with Frenet-Serret frames at two points along weld

DESCRIPTION OF THE INVENTION

FIG. 1a shows a torch and weld seam with the work angle, travel angle and torch roll angle defined along a general straight butt weld seam segment. A local or instantaneous axis tangent to the weld seam is defined and labeled (t). The axis lying along the weld wire at the torch tip is labeled (w). The axis orthogonal to both t and w is shown and labeled n. The work angle is a rotation about axis t and is measured from a line lying in the weld reference plane orthogonal to t. The travel angle is a rotation about the axis n. The torch roll angle is a rotation about the axis w.

FIG. 1b shows a torch and weld seam with the work angle, travel angle and torch roll angle defined along a general straight fillet weld seam segment. A local or instantaneous axis tangent to the weld seam is defined and labeled (t). The axis lying along the weld wire at the torch tip is labeled (w). The axis orthogonal to both t and w is shown and labeled n.

FIG. 2 shows a torch and weld seam with the work angle, travel angle and torch roll angle defined along a curved weld seam segment. A local or instantaneous axis tangent to the weld seam is defined and labeled (t). The axis lying along the weld wire at the torch tip is labeled (w). The axis orthogonal to both t and w is shown and labeled n. The work angle is a rotation about axis t. The travel angle is a rotation about the axis n. The torch roll angle is a rotation about the axis w.

FIG. 3 shows the robot manipulator (1), robot end effector (5) attached to the last joint of the robot (6). A welding torch or torch (7) is mounted to the robot end-effector. the lead-through teaching handle (2) with input units (10a, 10b, 10c). A teach pendant (3) and robot controller (4) is part of the robot system with memory storage located inside the robot controller (4). The lead-through teaching handle is connected to the end of the robot. A robot tool (5) forms the robot tool and is connected to the end of the robot. The welding torch can be removed from the robot while the lead-through teaching handle remains connected to the robot. The lead-through teaching handle (2) and the welding torch (7) are attached to the robot end-effector (5)

FIG. 4 shows a close-up of the lead-through teaching handle. In this case, input units are shown as momentary push buttons (10a, 10b, 10c) that control various aspects of robot control and programming and a switch on the lead-through teaching handle (11). Examples include robot free-drive mode, teaching points or arc set information. When the robot free-drive mode input unit is pressed, the operator is able to move the robot freely by applying small forces on the lead-through teaching handle. One manner in which this is done is by having the robot controller execute a torque feedback mode in which it adapts the robot movement to maintain the necessary torques required to support the robot in a stable configuration. These inputs could also be used to store or recall a specific torch orientation. For example, the robot orientation could be adjusted by the operator using robot jog controls or by moving the robot by hand. This orientation can be stored by the operator with an input unit. This stored orientation can be recalled or reset on the robot end effector at any time by the user, for example through another input unit. Through the robot kinematics, the orientation of the end-effector is changed while keeping the position of the torch tip constant.

The lead-through teaching handle could take many forms and has been demonstrated in multiple places in the literature. The lead-through teaching handle could even consist of the tool attached to the robot end-effector. The input units could take different forms including buttons, switches, pressure sensitive devices.

FIG. 5a,b,c shows the robot traveling along the length of a straight butt-joint weld seam. FIG. 5a shows the robot end-effector at one position (labeled $Pt_1$) with the end-effector and torch at a desired orientation. FIG. 5b shows the robot end-effector at a second position (labeled $Pt_2$) with the end-effector and torch at a different orientation than the first orientation shown in 5a. FIG. 5c shows the robot end-effector at the second position (labeled $Pt_2$) with the end-effector and torch now with the desired orientation, the same as the orientation at the first position.

Considering further FIGS. 5a,b,c, showing the robot traveling along the length of a straight butt-joint weld seam to perform a weld. For this weld, the weld specification defines a specific work angle and travel angle. A specific torch roll angle could also be defined. Alternatively, the operator, based on their experience and expertise, can define the torch orientation visually to achieve a certain weld performance. Over the linear weld, these three angles define a constant orientation of the torch relative to a fixed frame of reference. The operate can move the torch to this defined orientation and store it in memory. This can be done manually, with the torch shown in this orientation as in FIG. 5a. The operator can then move the torch to other positions along the weld seam, for example position P2 as shown in FIG. 5b. The operator can move the torch position only without concern for the torch orientation making the teach process faster. The weld path position can be stored as a combination of the torch position and stored orientation. Further, the operator can recall the stored orientation causing the robot to move the end-effector and torch to the defined orientation as shown in FIG. 5c. This automatic move process gives a simple visual method for the operator to verify the full pose of the robot.

The operator creates a program to make the robot perform a specific task by teaching successive positions by grasping and directly guiding the robot end effector to follow a path or to specific points on a path. This may be termed lead-through teach programming. In order to teach or record a step in the program, the operator will guide the robot end effector to a desired position and orientation relative to the workpiece. The position consists of translational displacements of the robot end effector and can be described with three translational parameters, for example x, y and z displacement. Furthermore, when referring to the position of the end-effector, this more specifically applies to the position of the tool center point, a particular point fixed in a frame attached to the end-effector. In the case of welding, the tool center point generally refers to the end of the welding wire extruded from the torch which is attached to the end-effector. Guiding the orientation consists of rotational motions of the robot end effector and can be described by three angular parameters occurring in an ordered sequence about particular axes, for example a Roll, Pitch, Yaw (RPY) angle rotations about the global x, y, and z axes respectively. For welding, both the position and orientation of the torch must be accurately defined. The translational position of the end-effector can be defined by the operator by moving the robot manually by applying forces to the robot arm or end-effector to guide the torch to a desired position. Alternatively, the robot operator can move the robot end-effector position by using the control pendant. In the same manner, the rotational orientation of the end effector can be defined by the operator by rotationally moving the robot manually by applying forces to the robot arm or end-effector to guide the torch to a desired orientation. Alternatively, the robot operator can rotationally move the robot end-effector orientation by using the control pendant. Together, the robot end-effector position and orientation constitute six independent parameters (for example x, y, z and R, P, Y) to describe the end-effector position and orientation in three-dimensional space. In some cases, the combination of position and orientation is called pose or posture.

For a specific welding operation, the torch orientation is prescribed by the welding procedure. In particular, a preferred work angle and travel angle are generally recommended or prescribed by the welding procedure. The torch roll angle does not affect the weld but may be arbitrarily prescribed. These three angles fully describe the robot end-effector orientation. The task of teaching a weld path can be reduced by using of these defined torch orientation values. In particular, the robot operator can focus on defining the translational position of the robot end-effector along the weld path, and then use another method to teach the robot end-effector orientation. Once method could be as follows. The robot operator could manually rotationally move the robot end effector to the desired orientation, prescribed by the welding procedure, and then store this desired orientation in a memory storage location in the robot controller. The orientation can be recalled directly by the robot program without changing the robot position. This can save significant time during program. The operator can translationally move the robot end-effector to subsequent positions in the weld path, and automatically recall the desired orientation (without changing the position of the robot end-effector). An example of this is shown in FIG. 5a-c. FIG. 5a shows the robot end-effector at one position and orientation along the weld path. This orientation is the desired orientation. FIG. 5b shows robot end-effector at a second position and arbitrary orientation along the weld path. FIG. 5c shows the robot end-effector at a third position and the desired orientation along the weld path. This desired orientation is automatically recalled from the saved desired orientation without changing the position of the robot end-effector. Here, the position that does not change is the Tool center point (TCP) and is defined as the tip of the welding wire extruding from the torch.

Alternatively, the operator can translationally move the robot end-effector to subsequent positions in the weld path and save these positions (x, y, z values) while the orientation is saved from the current desired orientation. This relieves the robot operator of the burden of exactly orienting the robot end-effector at each position. Another alternative is to define the desired orientation, and then cause the robot end-effector to maintain this orientation while the operator can only change the translation position of the robot end-effector while defining new positions in the weld path. This operation would be done by the robot controller which would only allow coordinated motions of the six joints that make up the robot to allow translational motion of the end-effector while holding the orientation of the end-effector fixed.

When a new portion of a weld path is defined, a new orientation may be defined. So the process of defining a desired orientation and saving this in memory and repeatedly using this new desired orientation to define weld poses or postures can be repeated throughout the entire weld teach operation as needed.

The desired orientation is stored into memory that is within or can be accessed by the robot controller. A portion of memory can be used or referenced to store these desired orientations. The desired orientation can be saved as a set of angles, R, P, Y defined about a specific set of axes. Alternative but equally satisfactory forms of defining the end-effector orientation can be used. The pose (position and orientation of the robot end-effector) that define the weld path are also saved into memory that is within or can be accessed by the robot controller. A pose that defines a point on the weld path is entered into memory by input from the user. This input could be an external button or selecting a task on the teach pendant. Generally, when storing points along a taught weld path, the pose that is stored is the current pose of the robot and consists of the current translation portion, x, y, z and current rotation portion, R, P, Y. In this invention though, the pose is taken in parts; The translation portion, x, y, z is taken from the current x, y, z position of the robot end-effector, while the rotation portion, R, P, Y is taken from the desired orientation that is saved in a stored memory location. To define a weld pose in this manner, the user will select an input such as an external button or selected a task on the teach pendant that indicates the two steps; one to use the desired orientation from the stored memory and two, to save the current x, y, z position and desired orientation from stored memory as a weld path point. One manner in which this occurs is the user pressing first a "recall" button to recall the desired orientation from stored memory and then pressing the "point" button to save this point as a stored point defining the weld path.

Alternatively, the robot could be arranged in the following way. When the user presses a "recall" button, the robot could move such that the current position of the robot end-effector stays constant, but the orientation moves to the desired orientation stored in memory. Then, the user could store the current robot pose (position and orientation) as the a stored point defining the weld path.

The desired orientation can be defined and saved into memory in a number of different ways. The operator can save a current orientation as a stored orientation. The operator can use jog or free-drive mode to move the robot end effector to a desired orientation. The orientation can be automatically calculated by the robot controller based on a desired set of work angle, travel angle and torch roll angle. The work angle and travel angle are defined from the weld specification and suggested values are defined in weld manuals. The torch roll angle can be a user preference or chosen to maximize some performance of the robot. If no angle is chosen, it can be arbitrarily selected. To complete the calculation of the orientation from these three angles, the instantaneous weld seam axis is needed. The instantaneous weld seam axis can be calculated directly from linear or curvilinear segments that make up the weld path. For linear segments, the weld seam axis is parallel to the linear segment. For curvilinear weld segments, the weld seam axis is tangential to the weld segment at each position along the weld segment. The weld seam axis can also be determined from previously-taught weld torch positions. The controller determines robot motion as linear segments or curvilinear segments between taught torch positions. The curvilinear portions are treated as a series of straight-line segments or higher-order curve from which the tangential axis can be calculated. In this case, the operator can train the torch tip weld positions without considering the torch and end effector orientation. The desired torch and end-effector orientation can be calculated by the robot controller from weld seam axis calculated from the linear segments or tangents to the curvilinear segments. The work angle, travel angle and torch roll angle can be defined as part of the weld specifications.

The orientation can be saved as a set of three angles, $\theta_w$, $\theta_T$, $\theta_R$, defined as a selected Euler angle set where the angles $\theta_w$, $\theta_T$, $\theta_R$ represent the work angle, travel angle and torch roll angle respectively. Other methods of storing or saving the orientation information can be defined including as a rotation matrix or a quaternion.

FIG. 6 shows a set of frames projecting a torch frame onto a fixed frame. Starting with a fixed frame, z axis lying along the axis of the weld seam and x axis lying in a reference plane (RP) and orthogonal to the z axis. The first operation is an SO(3) rotation about the z axis by the work angle, $\theta_w$, measured from the reference plane to the new x axis (x'). The second operation is an SO(3) rotation about the new y axis (y') by the travel angle, $\theta_T$, measured from the x' to the x" axis. The third operation is an SO(3) rotation about the new x axis (x") by the torch roll angle, $\theta_R$. This gives a mapping from the torch to the fixed frame as, $$R_{torch}^{fixed} = R_{z,\theta_w} * R_{y,\theta_T} * R_{x,\theta_R}.$$

The recalled orientation causes a rotation of the robot end-effector about a frame attached to the end-effector with the origin of the frame located at the tool center point or tip of the welding wire. In this manner the orientation recall causes the end effector orientation to change but does not change the position of the tool center point or the tip of the welding wire.

In the case of linear segments, the torch orientation frame remains constant with respect to a fixed frame when the work angle, travel angle and roll angle are constant. A stored orientation can be used multiple times anywhere along the linear segment. In the case of circular or curvilinear segments, the torch orientation changes with respect to a fixed frame, but remains constant with respect to the Frenet-Serret frame (or Frenet frame) whose origin moves with the torch tip. The Frenet-Serret frame axes are the local tangent, normal and binormal unit vectors to the circle or curve. These are can be found directly from the curve where the tangent vector is tangent to the curve, the normal vector is directed from the frame origin to the center of curvature of the curve, and the binormal vector completes the right-handed frame. Thus a mapping from the Frenet-Serret frame to the fixed frame is computed from the curve and is given in the rotation matrix, $R_{frenet-serret}^{fixed}$ and the mapping from the torch to the Frenet-Serret frame is fixed when set as the desired frame by the operator. Since the Frenet-Serret frame can be calculated from the curve, a stored orientation at one point along the circle or curve can be used multiple times anywhere along the curved or circular segment, with the additional operation of mapping the torch orientation defined at the first point on the curve, with the Frenet-Serret frame at the current point along the curve. At the first position along the curve, where the operator sets the current orientation as the desired orientation, the projection of the torch to the Frenet-serret or Frenet frame at that first position is recorded as a rotation matrix, $R_{torch}^{frenet-1}$. Then, for subsequent positions along the curve, the desired orientation is mapped or transformed using the projection of the current Frenet frame to the fixed or world frame; $R_{frenet-current}^{fixed}$. This is done by premultiplying the Rotation matrix projecting the torch to the first Frenet frame (Frenet-1) by the Rotation matrix projecting the current Frenet frame (Frenet-current) to the fixed frame as:

$$R_{torch}^{fixed} = R_{frenet-current}^{fixed} * R_{torch}^{frenet-1}$$

Linear segments could be treated in the same way as curvilinear segments, where the rotation matrix, $R_{frenet-current}^{fixed}$ is constant for linear segments. A unique definition of the Frenet frame may not exist solely on weld path information for linear segments. However, a unique Frenet frame could be derived from the first saved desired orientation and then reused at other points along the linear segment. For example, the torch axis (w in FIG. 1*a*) could be the binormal vector and the n axis (FIG. 1*a*) could be the Frenet frame normal vector.

What is claimed is:

1. A method for teaching a weld path for a robot end-effector with a tool center point comprising the steps of: manually move with force the robot end effector to a x y z position of the tool center point on the weld path; select a desired roll pitch yaw angle set orientation of the robot end effector from a memory storage in a robot controller; rotationally move the robot end effector to the desired orientation with the robot controller; store the weld path for the robot end effector as a combination of the x y z positions of the tool center point and the roll pitch yaw angle set orientation of the robot end effector.

2. A method for teaching a weld path for a robot end-effector with a tool center point according to claim 1 where the step of selecting a desired roll pitch yaw angle set orientation of the robot end effector from a memory storage in a robot controller is performed by pressing a button or switch.

3. A method for teaching a weld path for a robot end-effector with a tool center point according to claim 1 where the step rotationally move the robot end effector to the desired orientation with the robot controller is performed without changing the x y z position of the tool center point.

4. A method for teaching a weld path for a robot end-effector with a tool center point according to claim 1 where the step Rotationally move the robot end effector to the desired orientation with the robot controller is performed by pressing a button or switch.

5. A method for teaching a weld path for a robot end-effector with a tool center point according to claim 1 where the desired roll pitch yaw angle set orientation of the robot end effector is pre-saved.

6. A method for teaching a weld path for a robot end-effector with a tool center point according to claim 4 where the desired roll pitch yaw angle set orientation of the robot end effector is pre- saved through the steps of: Rotationally move the robot end-effector to the desired roll pitch yaw angle set orientation; Save the desired roll pitch yaw angle set orientation in a memory storage in a robot controller.

7. A method for teaching a weld path for a robot end-effector with a tool center point according to claim 4 where the desired roll pitch yaw angle set orientation of the robot end effector is pre-saved through the steps of: calculating the desired roll pitch yaw angle set orientation, from a weld specification consisting of a desired work angle, a desired travel angle, a desired torch roll angle; save the desired roll pitch yaw angle set orientation in a memory storage in a robot controller.

8. A method for teaching a weld path for a robot end-effector with a tool center point comprising the steps of: 10 manually move with force the robot end-effector to x y z position of the tool center point on the weld path; select a desired roll pitch yaw angle set orientation of the robot end effector from a memory storage in a robot controller; and store the weld path for the robot end effector as a combination of the x y z positions of the tool center point and the roll pitch yaw angle set orientation of the robot end effector.

9. A method for teaching a weld path for a robot end-effector with a tool center point according to claim 7 where the step save the desired roll pitch yaw angle set orientation in a memory storage in a robot controller is performed by pressing a button or switch.

10. A method for teaching a weld path for a robot end-effector with a tool center point according to claim 7 where the step rotationally move the robot end-effector to the desired roll pitch yaw angle set orientation is performed by applying an external force to the robot end-effector.

11. A method for teaching a weld path for a robot end-effector with a tool center point according to claim 7 where the step rotationally move the robot end-effector to the desired roll pitch yaw angle set orientation is performed by using a control pendant.

* * * * *